United States Patent [19]
Westermeyer et al.

[11] Patent Number: 5,901,559
[45] Date of Patent: May 11, 1999

[54] ELECTROMECHANICAL REGULATOR

[75] Inventors: Gary Westermeyer, Bluffs; Paul Isaacs, Auburn, both of Ill.

[73] Assignee: AC&R Components, Inc., Chatham, Ill.

[21] Appl. No.: 09/150,023

[22] Filed: Sep. 9, 1998

[51] Int. Cl.$^6$ .................................................. F25J 5/00
[52] U.S. Cl. .................................. 62/84; 62/158; 62/193; 62/188; 62/469; 417/12
[58] Field of Search .............................. 62/469, 471, 510, 62/157, 158, 188, 193, 84; 417/12, 228

[56] References Cited

U.S. PATENT DOCUMENTS

| | | | |
|---|---|---|---|
| 3,673,811 | 7/1972 | Adams et al. | 62/158 |
| 3,931,560 | 1/1976 | Willson | 62/158 X |
| 4,383,802 | 5/1983 | Gianni et al. | 417/12 |
| 4,557,115 | 12/1985 | Nakamura | 62/193 X |
| 5,199,271 | 4/1993 | Ewer | 62/193 X |
| 5,522,233 | 6/1996 | Nares et al. | 62/193 |
| 5,634,345 | 6/1997 | Alsenz | 62/193 X |
| 5,765,994 | 6/1998 | Barbier | 417/12 |

*Primary Examiner*—Henry Bennett
*Assistant Examiner*—Susanne C. Tinker
*Attorney, Agent, or Firm*—Hill & Simpson

[57] ABSTRACT

An oil level regulator is disclosed for use in a refrigeration system which has an oil reservoir and at least one compressor with a crankcase for containing oil. The regulator has a body with an interior fluid chamber for receiving oil. An inlet communicates with the fluid chamber of the body and is connected by a conduit to the oil reservoir of the system. An outlet communicates from the fluid chamber through a conduit through to the crankcase of the compressor. A level detecting mechanism is disposed within the fluid chamber for detecting an oil level therein. The level detector mechanism includes a solenoid assembly which is actuated by the detector mechanism when the oil level within the chamber is determined to be at or below a predetermined level. A microprocessor is provided on the regulator which communicates with the detector mechanism and the solenoid assembly. The microprocessor includes a delay timer for actuating the switch mechanism after a delay time period has passed from detection of a low oil level in order to provide fluid to the interior chamber. The microprocessor also includes a latching timer for holding the solenoid assembly in a position for feeding oil into the fluid chamber for a latching time period after an oil level is detected which is at or above the first predetermined level.

22 Claims, 4 Drawing Sheets

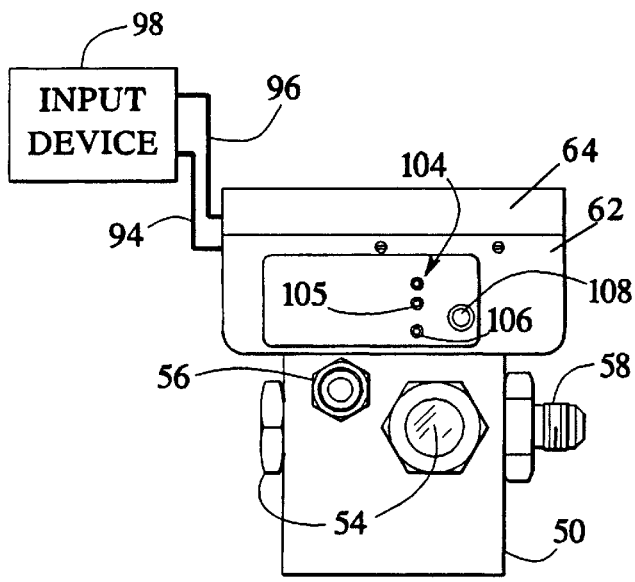
FIG. 5
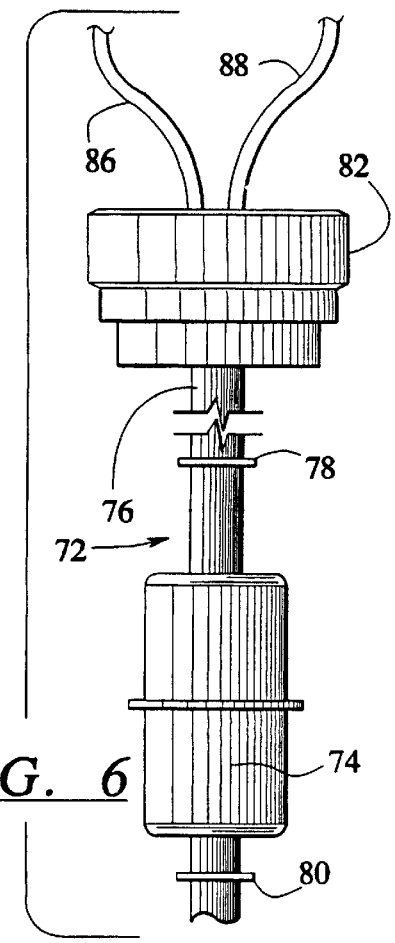
FIG. 6
FIG. 2
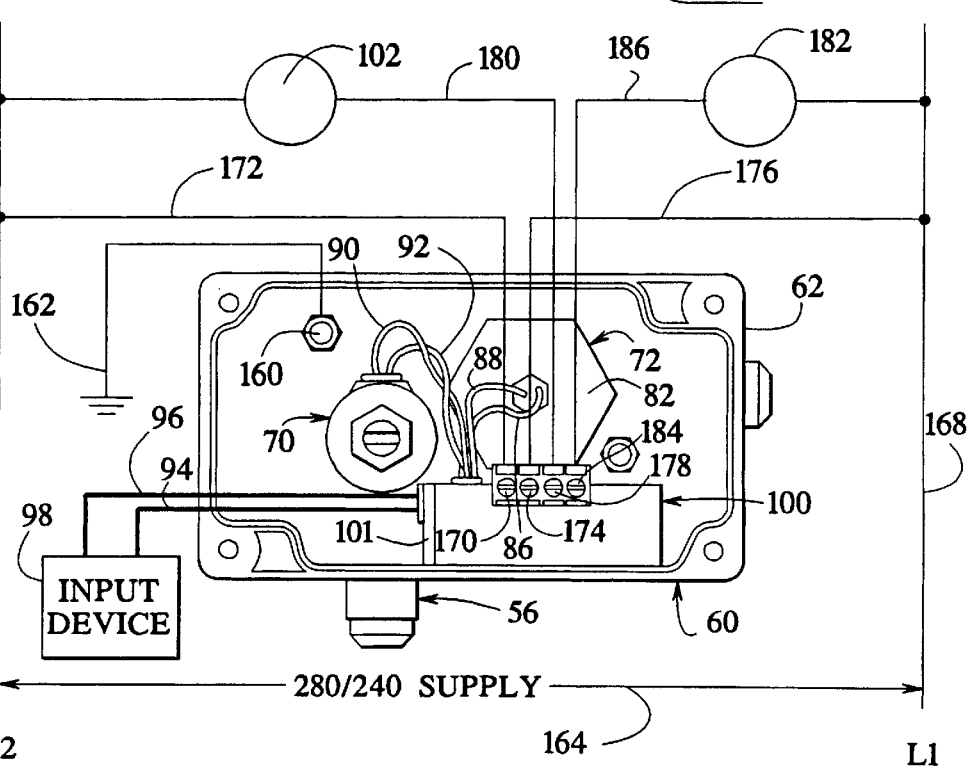

ELECTROMECHANICAL REGULATOR

BACKGROUND OF THE INVENTION

The present invention relates generally to a fluid level regulator. More particularly, the present invention relates to an oil level regulator for controlling the oil level in a compressor crankcase.

Mechanical oil level control systems and regulators are generally known for controlling the oil level in a compressor crankcase. For example, U.S. Pat. No. 2,246,244 discloses a prior oil level control system for a refrigeration compressor. An oil level regulator is desirably capable of adjusting the oil level of the associated crankcase within predetermined oil level limits. The oil level regulator disclosed in the aforementioned patent is not adjustable.

Adjustable mechanical regulators are generally known. U.S. Pat. No. 4,428,208, incorporated herein in its entirety, relates to such a device. That device includes a float which is connected at its side to a pivotable lever. Responsive to the oil level, the float travels along an arc, the float motion being constrained by the attached lever. The lever is operable to open or close a valve to control a flow of oil through an inlet. The inlet includes a vertically adjustable position to which the valve, lever and float assembly are attached. This assembly is adjustable with a separate adjustment pin which extends vertically through the top of the regulator housing to the valve. The pin is threaded to the valve so that the rotation of the pin from outside the regulator causes vertical adjustment of the valve assembly. Because the float has an amount of horizontal travel along its arc, the width of the conventional regulator must be sized accordingly. Therefore, a regulator design is desirable which is compact and simple to adjust.

An oil level regulator is disclosed in U.S. Pat. No. 5,542,499, incorporated herein in its entirety, for controlling the oil level in the crankcase of one or more refrigeration compressors or the like. The regulator has a closed chamber for containing the oil. A float-controlled switch is operable to actuate a solenoid valve for introducing liquid into the chamber as necessary to maintain the oil level in the chamber and the compressor crankcases. The regulator actuates an indicator, such as a light or an audible alarm, when a low-oil condition is present. Also, the regulator terminates operation of the compressor at a critically low oil level in order to prevent damage from inadequate lubrication.

These types of regulators include no time delay or controlled feed cycle. In some instances, too much oil or too little oil may be fed to a crankcase under varying operation conditions. In other cases, the introduction of high pressure oil may cause the float switch to bounce causing abbreviated feed cycles of a fraction of a second or false alarms. This lack of a feed cycle renders such regulators poorly suited to high-pressure oil systems. Additionally, many of these prior art regulators include 24-volt power systems which require a customer to supply relay and time delay features to open the compressor control circuit and shut off the compressor. Further, such regulators reset immediately upon the oil level in the compressor reaching a set point. Such designs allow the compressor to run without correcting the initial oil level problem or cause.

SUMMARY OF THE INVENTION

The present invention overcomes the aforementioned problems and offers several advantages over prior art regulators. The regulator of the present invention utilizes responsive electromechanical components rather than conventional mechanical components. Additionally, the regulator of the invention includes a pre-programmed microprocessor providing several features which are critical but not available on prior art designs.

In one embodiment, an oil level regulator is disclosed for use in a refrigeration system having an oil reservoir and at least one compressor with a crank case for containing oil. The regulator has a body with a fluid chamber for receiving oil therein. An inlet communicates with the fluid chamber and is connected by a conduit to an oil reservoir. A solenoid assembly controls flow of oil through the inlet into the fluid chamber. An outlet communicates from the fluid chamber and is connected by a conduit to the crank case of the compressor. A float mechanism detects an oil level within the fluid chamber. A microprocessor is electrically connected to the solenoid assembly and the float mechanism. The microprocessor has a delay timer, a cycle timer and a latching timer. The delay timer prevents actuation of the solenoid assembly until a start delay period has passed and after the float mechanism detects a low oil level within the fluid chamber. The cycle timer permits actuation of the solenoid assembly over a feed period during at least part of a feed cycle. Delivering oil to the fluid chamber after detection of the low oil level and passage of the start delay period. The latching timer continues actuation of the solenoid assembly for a latching time period after the oil level within the fluid chamber reaches a satisfactory level and then deactivates the solenoid assembly.

In one embodiment, the regulator has a total cycle timer which is actuated in the event that the oil level does not reach a satisfactory oil level after passage of a total cycle period and terminates operation of the compressor.

In one embodiment, the start delay period is about 9 seconds. In one embodiment, the latching time period is about 2 seconds. In one embodiment, the total cycle period is about 120 seconds.

In one embodiment, the regulator includes an alarm indicator which is actuated in the event that the oil level does not reach a satisfactory oil level after a predetermined number of cycles have passed.

In one embodiment, the regulator has an alarm indicator which is actuated in the event that the total cycle timer is actuated.

In one embodiment, the microprocessor has a second delay timer to prevent actuation of the solenoid assembly until a single cycle delay period has passed. In one embodiment, the regulator has the single cycle delay period is about 20 seconds.

In one embodiment, the regulator has a cycle counter to count a predetermined indicator in order to keep track of a number of cycles of operation of the cycle timer.

In one embodiment, the regulator has at least one input device which measures a further regulated device parameter, such as the temperature or pressure in the regulated device (in this case a compressor). The input device is electrically connected to the microprocessor such that when particular criteria are met, the microprocessor terminates operation of the compressor. In one embodiment, the input device and microprocessor activate an alarm indicator when particular criteria are met.

In one embodiment of the present invention, a method of operating an oil level regulator for maintaining a proper oil level within a system is disclosed wherein the oil level regulator has a fluid chamber with an oil level therein and a solenoid assembly for controlling flow of oil into the fluid chamber, the method includes detecting an oil level within the fluid chamber and determining when the oil level reaches a predetermined low oil level condition. A start delay period then passes after detection of the low oil level. A cycle counter is then set to a predetermined value after passage of the start delay period and after re-detecting the low oil level. The solenoid assembly is then operated to deliver oil into the fluid chamber. The oil level is then re-checked and when the oil level reaches a satisfactory oil level or when a feed cycle period has passed, the solenoid assembly then is run to deliver oil to the fluid chamber for an additional latching time period and then stopped. The cycle counter is checked and another cycle is run if the cycle counter has not yet reached zero and if the oil level remains at a low oil level. The oil level regulator is then stopped and an alarm indicator is set off after completing the predetermined number of cycles if the oil level has not reached a satisfactory oil level.

In one embodiment, the cycle counter is set to a value of 6. In one embodiment, the delay period is about 9 seconds. In one embodiment, the cycle time period is about 20 seconds. In one embodiment, the latching time period is about 2 seconds.

In one embodiment, the method also includes actuating a total cycle timer in the event that the oil level does not reach a satisfactory oil level after a total cycle period thereby terminating operation of the regulator. In one embodiment, the total cycle period is about 120 seconds.

Additional objects, features and advantages of the present invention are described herein and will be apparent from the Detailed Description of the Presently Preferred Embodiments and from the related drawing figures.

BRIEF DESCRIPTION OF THE DRAWINGS

FIG. 2 illustrates a top plan view of a regulator constructed according to the present invention with a cover plate removed and a basic schematic diagram of the system.

FIG. 5 illustrates a front elevational view of a regulator constructed according to the present invention.

FIG. 6 illustrates a front elevational view of the float mechanism of a regulator constructed according to the present invention.

DETAILED DESCRIPTION OF THE PREFERRED EMBODIMENTS

Figure 1:
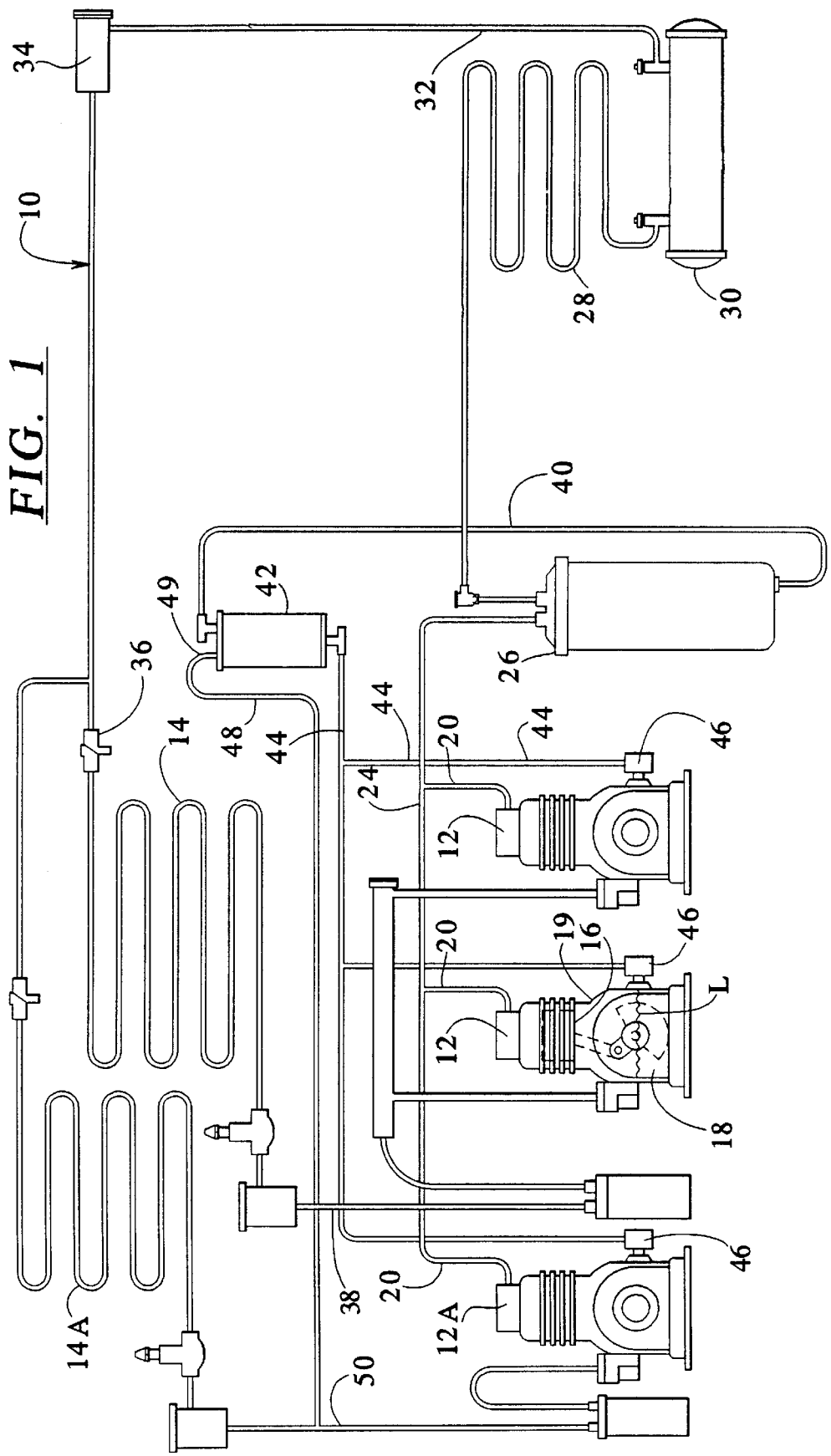
FIG. 1 illustrates a refrigeration system incorporating an oil level regulator embodying the principles of the present invention.
Figure 3:
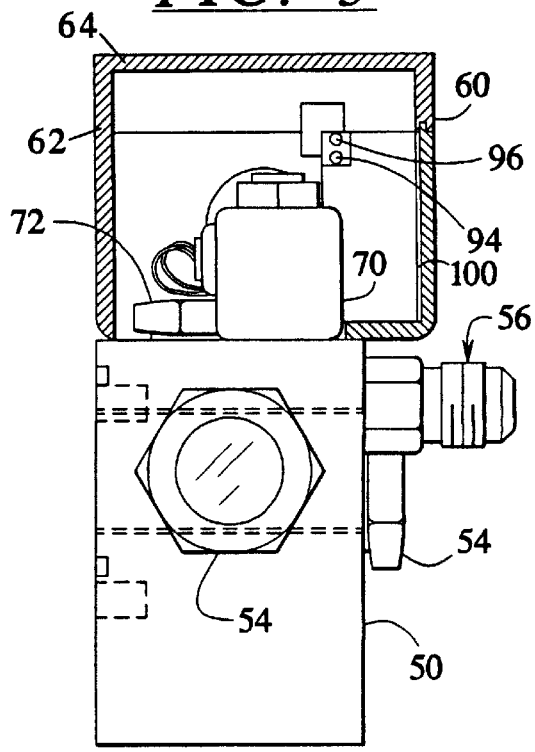
FIG. 3 illustrates a side sectional view of a regulator constructed according to the present invention.

A standard refrigeration system 10 is illustrated in FIG. 1. As shown, one or more compressors 12 are used to compress a refrigerant gas after that gas has expanded in an evaporator 14. It is also possible to provide a system which has only one compressor. Each compressor 12 has a reciprocating piston 16. Oil 18 is supplied to a crankcase 19 of the compressor 12 in order to lubricate moving components of the compressor and to enhance sealing of the piston for efficient compressing.

During operation of the compressor 12, the oil becomes atomized and mixed with the refrigerant as the mixture leaves through an exit conduit 20. In an embodiment where there are multiple compressors in a parallel arrangement, as shown in FIG. 1, a mixture passes into a manifold 24 which communicates with additional compressors 12.

The presence of oil in the refrigerant mixture decreases the system efficiency because oil is not a refrigerant. Therefore, an oil separator 26 is provided in the line between the compressor 12 and a condenser 28 to remove oil from the refrigerant gas. Refrigerant gas flowing into the condenser 28 is cooled and condensed into a liquid which his captured in a receiver 30. The cooled refrigerant liquid then flows through a conduit 32, through a filtered dryer 34, and through an expansion valve 36 to an evaporator 14. In the evaporator 14 the liquid refrigerant evaporates and absorbs heat energy. As a result, an area associated with the evaporator is cooled. The refrigerant gas then flows through a conduit 38 to return to the compressors 12. More then one evaporator 14, 14A may be provided in an embodiment wherein one or more satellite compressors 12A are provided.

Oil removed from the refrigerant by the oil separator 26 is directed through a conduit 40 to an oil reservoir 42. From the reservoir 42, the oil is supplied through conduits 44 to the compressors 12. An oil level regulator 46 associated with each compressor 12 introduces a proper amount of oil to the corresponding compressor. The oil reservoir 42 is provided with a vent line 48 having a valve 49 to reduce the pressure within the oil reservoir to a level just slightly exceeding that present in a gas inlet line 50. This arrangement provides a slight positive pressure to insure that an adequate oil supply from the reservoir 42 is provided to the oil level regulators 46.

The regulator 46 of the present invention controls the oil level in each crankcase 19 by means of a float operated valve which is described in further detail below in connection with FIGS. 2–6. When an adequate oil level L is present in the compressor crankcase, the regulator 46 closes oil flow from the conduit 44 providing no additional oil. However, when the oil level L drops below a desired level, the regulator 46 opens a flow of oil from the conduit 44 into the crankcase 19 until an adequate level L is restored. Oil from the oil reservoir 42 is thus returned into the crankcase 19.

Turning now to FIGS. 2–6, a regulator 46 constructed in accordance with the principles of the present invention is illustrated in greater detail. The regulator 46 preferably has a body 50 with an interior fluid chamber 52 therein. The body 50 also includes at least one, and in the present embodiment two, sight glass fittings 54 threaded into the body so that one may view the interior fluid chamber 52. The body also includes a pair of fluid fittings, an inlet fitting 56 and an outlet fitting 58, each having an interior passage way 59 providing a fluid path between the interior chamber 52 and the exterior of the body 50. The fluid fittings or tubes 56 and 58 extend from the body 50 at about 90° or a right angle relative to one another. The outlet fitting 58 communicates with the crankcase 19 and the inlet fluid fitting 56 communicates with the reservoir 42 as described previously.

The sight glass fittings 54 are positioned relative to the body 50 to enable visual sighting of the oil level L within the fluid chamber 52 from the exterior of the regulator 46. The sight glass fittings 54 therefore allow an operator to monitor the oil level in the regulator 46 and associated crankcase 19 during normal operation of the system. The outlet fluid fitting 58 may be an equalization fitting which communicates with the interior chamber 52 for optionally providing equalization of oil levels between multiple oil compressor crankcases as is known in the art. The fitting 56 is an inlet fitting connectable to the conduit 44 illustrated in FIG. 1 for receiving a supply of oil from the reservoir 42.

Secured to the top of the regulator body 50 is a housing 60 which holds therein various electronic components of the regulator 46. The housing 60 in the present embodiment has a base shell 62 and a cover plate 64. The cover plate 64 has been removed in the view illustrated in FIG. 2.

Received within the housing 60 is a solenoid assembly 70 connected to a solenoid valve (not shown) within the inlet fitting 56 to selectively control fluid delivery through the inlet into the interior fluid chamber 52. The solenoid valve is generally closed and is opened by the solenoid assembly 70 as needed and as described in further detail below in order to feed the proper amount of oil to the regulator 46.

A vertically oriented float mechanism 72 is received within the fluid chamber 52 for accurately monitoring the oil level within the regulator 46. The float mechanism 72 includes a float switch assembly 74 slidably received over a vertically oriented float tube 76. The float tube 76 includes an upper and a lower stop element 78 and 80, respectively, for limiting the travel of the float switch assembly along the tube. The float switch assembly 74 rises and falls within the fluid chamber 52 slidably along the float tube 76 according to the level of fluid within the chamber. The switch portion of the float switch assembly 74 may be any type of suitable switch including a reed-type switch which has a magnet carried on the float switch assembly to acuate a plurality of reeds providing an indication of fluid level.

Figure 4:
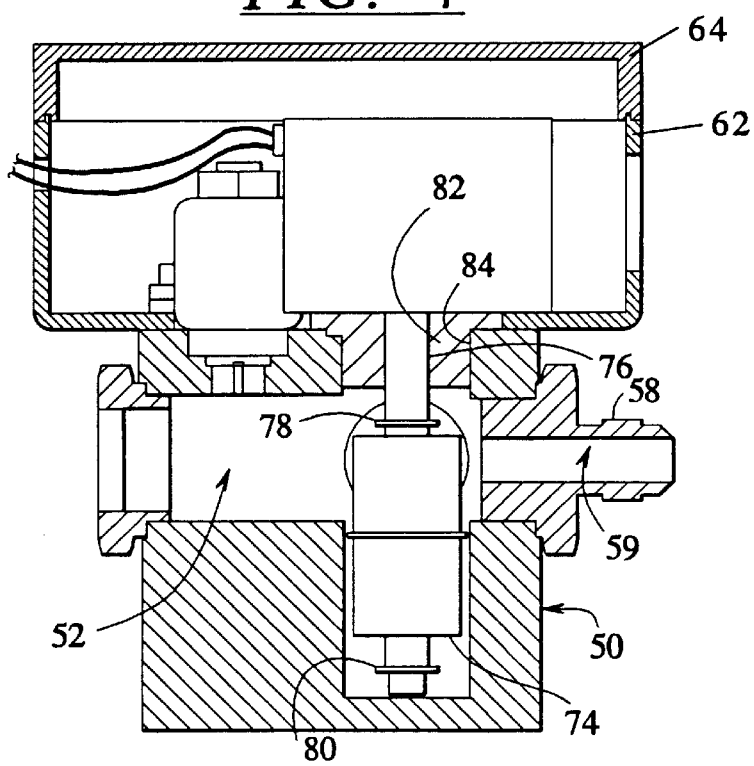
FIG. 4 illustrates a front sectional view of a regulator constructed according to the present invention.

FIGS. 4 and 6 best illustrate the float mechanism 72. A fitting 82 is disposed at the top of the float tube 76 for sealingly securing the float mechanism 72 to an upper opening 84 in the housing 50. Thus, a portion of the fitting 82 at the top of the float mechanism 72 protrudes into the housing 60 above the regulator body 50. A pair of electrical leads or wires 86 and 88 extend upward from the fitting 82 which provide a signal representing the oil level to the electronic components as is described below in more detail.

FIGS. 2 and 5 show a further input device 98 as a schematic element. Input device 98 may be any of device designed to measure a regulated device parameter and send an appropriate signal to microprocessor 101. The purpose of such an input device is to allow the regulator to react automatically with either an alarm indicator or compressor shut down when appropriate predetermined criteria are met. Some useful input devices include temperature sensors, pressure sensors, timers, and many other types of meters and sensors which can be used to determine alarm or shut down criteria. The most common alarm or shut down criteria would be those suggestive of coolant leaks or oil leaks. Any number of additional input devices and criteria could be used (though only one is shown) but an appropriately complex microprocessor and algorithm would be required for coordinating larger numbers of input devices. Alternatively, input devices themselves could use resident microprocessors with the appropriate shut-down criteria to determine whether an alarm or shut down is necessary. The signal received by microprocessor 101 could directly communicate the need for an alarm or shut down with no further analysis required by microprocessor 101.

As illustrated in FIG. 2, an electronic control module 100 including a microprocessor 101 is received within the housing 60. The wire leads 86 and 88 extending from the float mechanism 72 are electrically connected to the module 100. Similarly, the wire leads 90 and 92 are electrically connecting the module 100 to the solenoid assembly 70. Further, wire leads 94 and 96 electrically connect the module 100 to input device 98.

The electronic control module 100 is preprogrammed to receive oil level signals from the float mechanism 72 and to precisely control the actuation of the solenoid assembly 70 in order to regulate the amount of oil entering the interior fluid chamber 52 of the regulator 46. A flow chart illustrating the particular programming process for controlling the oil regulator 46 is illustrated in FIG. 8.

Figure 7:
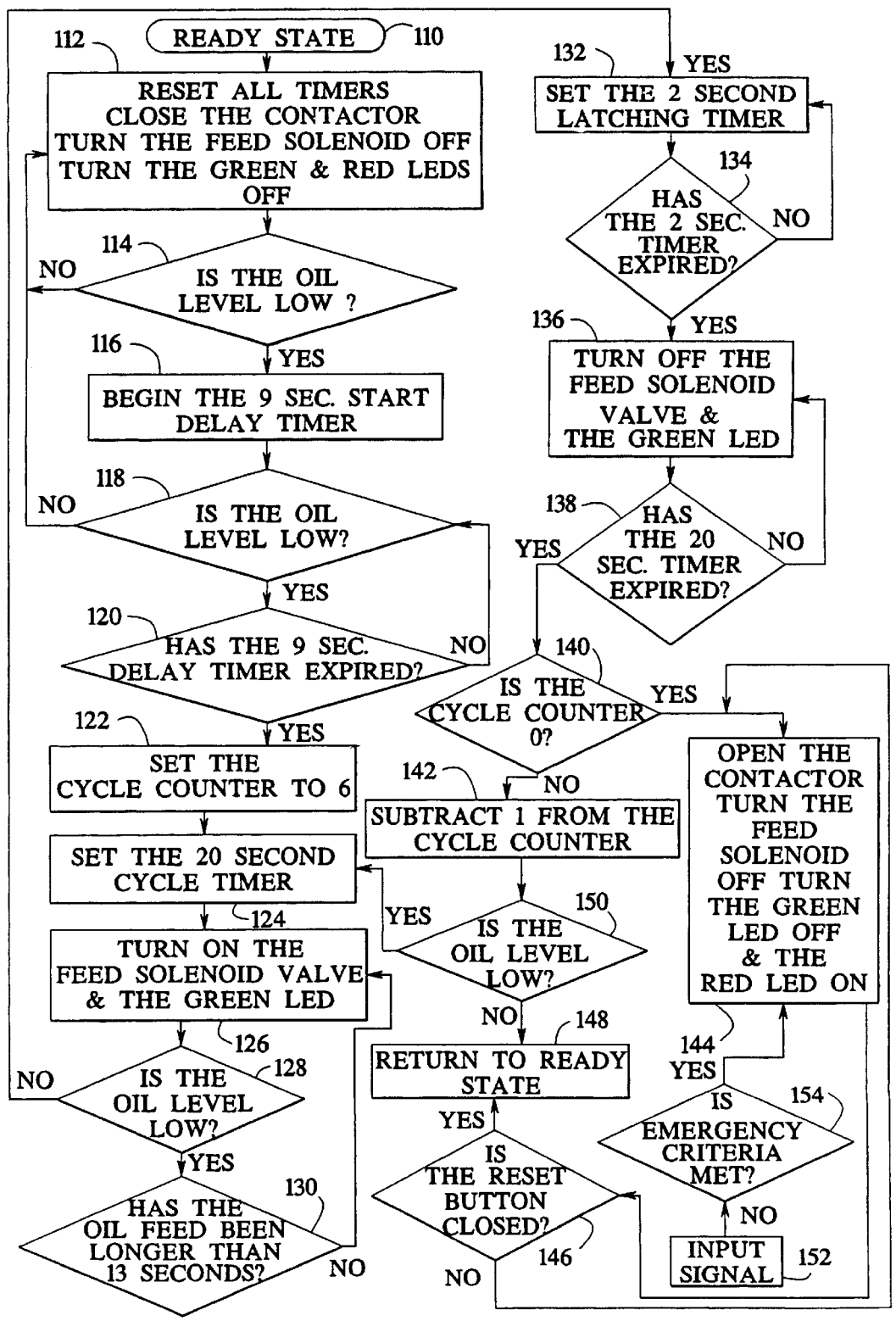
FIG. 7 illustrates a flow chart schematic showing the operation of the microprocessor of a regulator constructed according to the present invention.

Referring to FIG. 7, the regulator 46 and module 100 begin at a READY STATE shown as diagram block 110. When in this state, the control module performs several functions. First it resets all the timers of the system to zero. The module then closes the electrical contacts or compressor contactor 102 in order to provide power to the system. The feed solenoid or solenoid assembly 70 is then turned off. Any LED indicators are turned off as well. For example, FIG. 4 illustrates a front indicator panel 104 which includes thereon an alarm LED 105 which in the present embodiment is preferably a red LED indicator and a feed LED 106 which in the present embodiment is preferably a green LED indicator. The indicator panel also includes a manual reset button 108, the function of which is described in more detail below. The READY STATE and the associated conditions are indicated by blocks 110 and 112 in the flow chart diagram of FIG. 8.

The microprocessor program next receives a signal from the float mechanism 72 and determines whether the oil level is low compared to a desired level. This is indicated in diagram block 114. If the oil level is correct or not low, the program proceeds to run a loop from block 114 back to the READY STATE block 112 and will continue to do so until a low oil level is detected. Once a low oil level is first detected, the program proceeds begins a nine second delay cycle in restarting the system as is indicated by block 116 in the diagram. The program again checks whether the oil level is low. If the oil level is correct or not low, the program returns or loops back to the READY STATE block 112. If the oil level is still detected as low, the program next determines whether the nine second delay period has expired. If it has not expired, the program loops back to the previous block 118 and continues to monitor the oil level. If the oil level continues to be low, the program continues to check whether the nine second delay period has expired as indicated in block 120. Once the nine second delay period has expired the program proceeds to the next step or block 122 wherein a cycle-counter within the module is set to a preferred number, for example 6 in the present embodiment. The program next sets a 20 second timer or single cycle delay timer as indicated in block 124 of FIG. 8.

As indicated in block 126 of the diagram, the program next turns on the feed solenoid valve of the solenoid assembly 70 and turns on the green LED or feed indicator 106. The program next again checks whether the oil level L is low as illustrated in block 128, and if so, the program determines whether the oil feed has been on for longer than 13 seconds as illustrated in block 130. If the oil level is satisfactory or not low, the program sets a two second timer as illustrated in block 132. However, if the oil level is still low, the program checks the elapsed time of the 20 second timer. If the oil feed has not been longer than 13 seconds, the program loops back to again determine whether the oil level is low. If the oil level remains low and the oil feed then has continued longer than 13 seconds, the program proceeds to block 132 wherein the two second timer is turned on. As indicated in block 134, the program then continues to loop until the two second timer has expired.

Once expired, the program continues to block 136 wherein the feed solenoid valve of the solenoid assembly 70 and the green LED are turned off again. The program then determines as illustrated in block 138 whether the 20 second timer has expired. If not, the program continues to loop until the 20 seconds has fully elapsed. Once the 20 second timer has expired, the program checks the cycle-counter as illustrated on block 140 of the diagram.

If the cycle-counter is already at zero, the program continues to block 144 wherein the module again performs several functions. First, the compressor or contactor 102 is opened and the feed solenoid assembly 70 is turned off. The red LED or alarm indicator 105 is then turned on. Once the module performs these tasks the module next determines as indicated in block 146 whether the reset button 108 is closed or has been manually reset. If the reset button has been reset, the program returns to the READY STATE and the regulator begins its cycle over again. If the reset button has not been manually closed, the program loops back to block 144 whereby the red LED 105 remains lit indicating that the reset button must first be closed or reset prior to returning to the READY STATE.

If the cycle-counter in block 140 was greater than zero, the program then subtracts one from the last previous cycle-counter value as illustrated in block 142. The program next determines at block 150 whether the oil level remains low. If the level is satisfactory or not low, the program returns to the READY STATE indicated by block 110 and starts the cycle again. If the oil level remains low, the program loops back to block 124 and resets the 20 second timer, turns on the feed solenoid valve and the green LED or feed indicator 106 to feed more oil into the interior fluid chamber 52.

To briefly summarize the operation of the programmed system, the microprocessor 101 runs the regulator 46 as follows. Upon an initial low oil level condition, the unit begins a nine second delay. If the oil level is satisfactory, the microprocessor continues to monitor the oil level every nine seconds to continually determine if the regulator 46 needs to feed oil to the compressor crankcase 19. This permits any initial turbulence which may be caused by the compressor start-up or other momentary oil level variation within the crankcase 19 to settle out prior to feeding oil to the system. If the oil level is low at the end of any nine second cycle, a feed cycle begins.

Each of the feed cycles includes a two second latching period. This essentially means that once the cycle begins, the system will feed oil until the compressor oil requirements are satisfied and then feed an additional two seconds after the level is satisfied during the feed cycle. The regulator 46 will then wait a certain period before allowing the oil to feed again. A total cycle is permanently set roughly about 20 seconds.

For example, if the oil level rises to a satisfactory condition in three seconds, the regulator 46 will feed oil for five seconds and then wait the rest of the total cycle or 15 seconds, without providing further oil. In this manner, the microprocessor within the module 100 continually self-adjusts for different pressures at which the oil will be fed into the regulator 46. The regulator 46 will feed oil longer for low oil pressures coming into the regulator and wait less time between feed cycles. For higher oil pressures, the regulator will feed for a shorter period of time and wait longer between feed cycles.

This preprogrammed logic of the microprocessor 101 within the module 100 permits the regulator 46 to maintain the optimum volume of oil feed for low oil pressures and yet prevents too much oil from being fed under high pressure conditions. The system essentially allows for the oil to settle out and balance within the larger crankcase cavity. The regulator 46 continues to cycle every 20 seconds until oil levels within the crankcase reach a predetermined set or satisfactory level.

Microprocessor 101 also receive signals from input device 98. This input signal is indicated by block 152. Either a microprocessor resident to input device 98 or microprocessor 101 itself then interprets the input signal by comparing it against emergency criteria which would warrant an alarm indication and shutdown of the compressor, represented by block 154. If the emergency criteria is met, microprocessor 101 initiates the procedures of block 144, the compressor and the feed solenoid are turned off, and the alarm LED is lit. This provides time for manual investigation and correction of the problem and requires a manual reset to return the regulator to READY STATE. In a system with multiple input devices in addition to the oil level regulator, more than a single alarm LED may be required to provide the user with some insight into the specific reason for the shut down.

The emergency criteria of block 154 may be a simple critical value that causes shut down if the criteria is met (i.e. if the pressure falls below pressure P or the temperature exceeds temperature T). However, the emergency criteria for input signals may be as complex as that given for oil level. The emergency criteria may involve multiple readings and an interrelationship of delays and cycles to determine when shut down is appropriate.

Another feature of the present invention is that the regulator alarm circuit is a 240 volt AC and 36 VA system which eliminates the need for an external customer-supplied relay and time delay. This is so because it can be wired into the 240 volt compressor control circuit that shuts off the compressor itself.

If the oil level within the crankcase 19 does not reach a satisfactory level due to insufficient oil feeding to the regulator within six cycles or 120 seconds, the microprocessor 101 of the module 100 opens the alarm circuit which in turn shuts off the compressor and turns on the red LED or alarm indicator 105 on the indicator panel 104 of the regulator 46. This prevents the compressor from running out of oil and damaging the compressor.

The regulator remains off until service personnel physically correct the low oil condition within the system. Once the operator fills the system with oil to a satisfactory level, the manual reset button 108 is pressed closing the reset circuit as indicated in block 146 of the diagram. The regulator 46 then continues and begins the nine second delay cycle and the feed cycles until a low oil condition is again sensed by the alarm circuit. The use of a manual reset button 108 and the time delay circuit permits oil to be added to the oil reservoir 42 and fed to the compressor by the regulator 46 instead of having to add oil directly to the compressor.

FIG. 2 illustrates the basic wiring schematic for the regulator 46. The base shell 62 of the housing 60 includes a ground connection 160 with an electrical lead or wire 162 leading to a sufficient ground for the regulator. A 240 volt power supply 164 is connected to the regulator 46 via electrical leads or wires 166 and 168. The lead 166 is connected directly to a terminal 170 of the module 100 via a lead or wire 172. Similarly, the lead 168 is connected to a terminal 174 of the module 100 via a lead or wire 176. The module 100 is also connected directly to the compressor contactor coil 102 through a terminal 178 and lead 180. A safety switch 182 is connected to the module 100 via a terminal 184 and a lead 186. The safety switch is also connected to the power source lead 168. The safety switch is intended to protect the electronic control module 100 of the regulator 46 from damage from a power surge or problem from the power source 164 or from the compressor itself.

It should be understood that various changes and modifications to the presently preferred embodiments described herein will be apparent to those skilled in the art. Such changes and modifications may be made without departing from the spirit and scope of the present invention and without diminishing its attendant advantages. It is therefore intended that such changes and modifications be covered by the appended claims.

What is claimed is:

1. An oil level regulator for use in a refrigeration system having an oil reservoir and at least one compressor with a crankcase for containing oil, said regulator comprising:

a body with a fluid chamber for receiving oil;

an inlet into said fluid chamber of said body connected by a conduit to said oil reservoir;

a solenoid assembly controlling flow of oil through said inlet into said fluid chamber;

an outlet from said fluid chamber of said body connected by a conduit to said crankcase of said compressor;

a float mechanism for detecting an oil level within said fluid chamber;

a microprocessor electrically connected to said solenoid assembly and said float mechanism, said microprocessor having a delay timer, a cycle timer, and a latching timer;

said delay timer to prevent actuation of said solenoid assembly until a start delay period has passed after detection of a low oil level below a predetermined satisfactory oil level;

said cycle timer to permit actuation of said solenoid assembly for a feed period during at least part of a feed cycle period to deliver oil to said fluid chamber after detection of said low oil level and after passage of said start delay period; and said latching timer to continue actuation of said solenoid assembly for a latching time period after said oil level is detected by said float mechanism to have reached said satisfactory oil level and thereafter deactivating said solenoid assembly.

2. An oil level regulator according to claim 1, further comprising:

a total cycle timer which is actuated in the event that said oil level does not reach said satisfactory oil level after a total cycle period to terminate operation of said compressor.

3. A fluid level regulator comprising:

a body with a fluid chamber for receiving a fluid;

an inlet into said fluid chamber of said body;

an outlet from said fluid chamber of said body;

a level detector mechanism to detect an fluid level within said fluid chamber;

a solenoid assembly actuated by said level detector mechanism to control flow of fluid through said inlet into said fluid chamber;

a microprocessor electrically connected to said solenoid assembly and said level detector mechanism, said microprocessor having a delay timer, a cycle timer, and a latching timer;

said delay timer to prevent actuation of said solenoid assembly until a start delay period has passed after detection of a low fluid level below a predetermined satisfactory fluid level;

said cycle timer to permit actuation of said solenoid assembly for a feed period during at least part of a feed cycle to deliver fluid to said fluid chamber after detection of said low fluid level and after passage of said start delay period; and said latching timer to continue actuation of said solenoid assembly for a latching time period after said fluid level is detected by said level detector mechanism to have reached said satisfactory fluid level and thereafter deactivating said solenoid assembly.

4. A fluid level regulator according to claim 3, further comprising:

a total cycle timer which is actuated in the event that said fluid level does not reach said satisfactory fluid level after a total cycle period to terminate operation of a regulated device connected to said fluid level regulator.

5. A fluid level regulator according to claim 3, wherein said level detector mechanism comprises a vertically movable float mechanism.

6. A fluid level regulator according to claim 3, wherein said start delay period is about 9 seconds.

7. A fluid level regulator according to claim 3, wherein said latching time period is about 2 seconds.

8. A fluid level regulator according to claim 4, wherein said total cycle period is about 120 seconds.

9. A fluid level regulator according to claim 3, further comprising:

an alarm indicator which is actuated in the event that said fluid level does not reach said satisfactory fluid level after a predetermined number of cycles have passed.

10. A fluid level regulator according to claim 4, further comprising:

an alarm indicator which is actuated in the event that said total cycle timer is actuated.

11. A fluid level regulator according to claim 3, further comprising:

a second delay timer of said microprocessor to prevent actuation of said solenoid assembly until a single cycle delay period has passed.

12. A fluid level regulator according to claim 11, wherein the single cycle delay period is about 20 seconds.

13. A fluid level regulator according to claim 3, further comprising:

a cycle counter to count a predetermined indicator in order to keep track of a number of cycles of operation of said cycle timer.

14. A fluid level regulator according to claim 3, further comprising:

at least one input device electrically connected to said microprocessor and measuring at least one regulated device parameter whereby said parameter is compared against predetermined criteria and said microprocessor terminates operation of a regulated device connected to said fluid level regulator if said emergency criteria is met.

15. A fluid level regulator according to claim 3, further comprising:

at least one input device electrically connected to said microprocessor and measuring at least one regulated device parameter whereby said parameter is compared against predetermined criteria and said microprocessor actuates an alarm indicator if said emergency criteria is met.

16. A method of operating an oil level regulator system wherein the oil level regulator has a fluid chamber with an oil level therein and a solenoid assembly for controlling flow of oil into said fluid chamber, said method comprising the steps of:

detecting an oil level within said fluid chamber and determining when said oil level reaches a predetermined low oil level condition;

beginning a start delay period after detection of said low oil level;

setting a cycle counter to a predetermined value after passage of said start delay period and after re-detecting said low oil level;

operating said solenoid assembly after passage of said start delay period to deliver oil into said fluid chamber;

re-checking said oil level and when said oil level reaches a satisfactory oil level or when a feed cycle period has passed;

running said solenoid assembly to deliver oil to said fluid chamber for an additional latching time period;

checking the cycle counter and running another cycle if the cycle counter has not yet reached zero and if said oil level remains at said low oil level; and stopping said oil level regulator and setting off an alarm indicator after completing the predetermined number of cycles if said oil level has not reached said satisfactory oil level.

17. A method according to claim 16, wherein said cycle counter is set to a value of 6.

18. A method according to claim 16, wherein said delay time period is about 9 seconds.

19. A method according to claim 16, wherein said cycle time period is about 20 seconds.

20. A method according to claim 16, wherein said latching time period is about 2 seconds.

21. A method according to claim 16, further comprising the step of actuating a total cycle timer in the event that said oil level does not reach said satisfactory oil level after a total cycle period thereby terminating operation of said method.

22. A method according to claim 21, wherein said total cycle period is about 120 seconds.

* * * * *